United States Patent Office 2,931,228
Patented Apr. 5, 1960

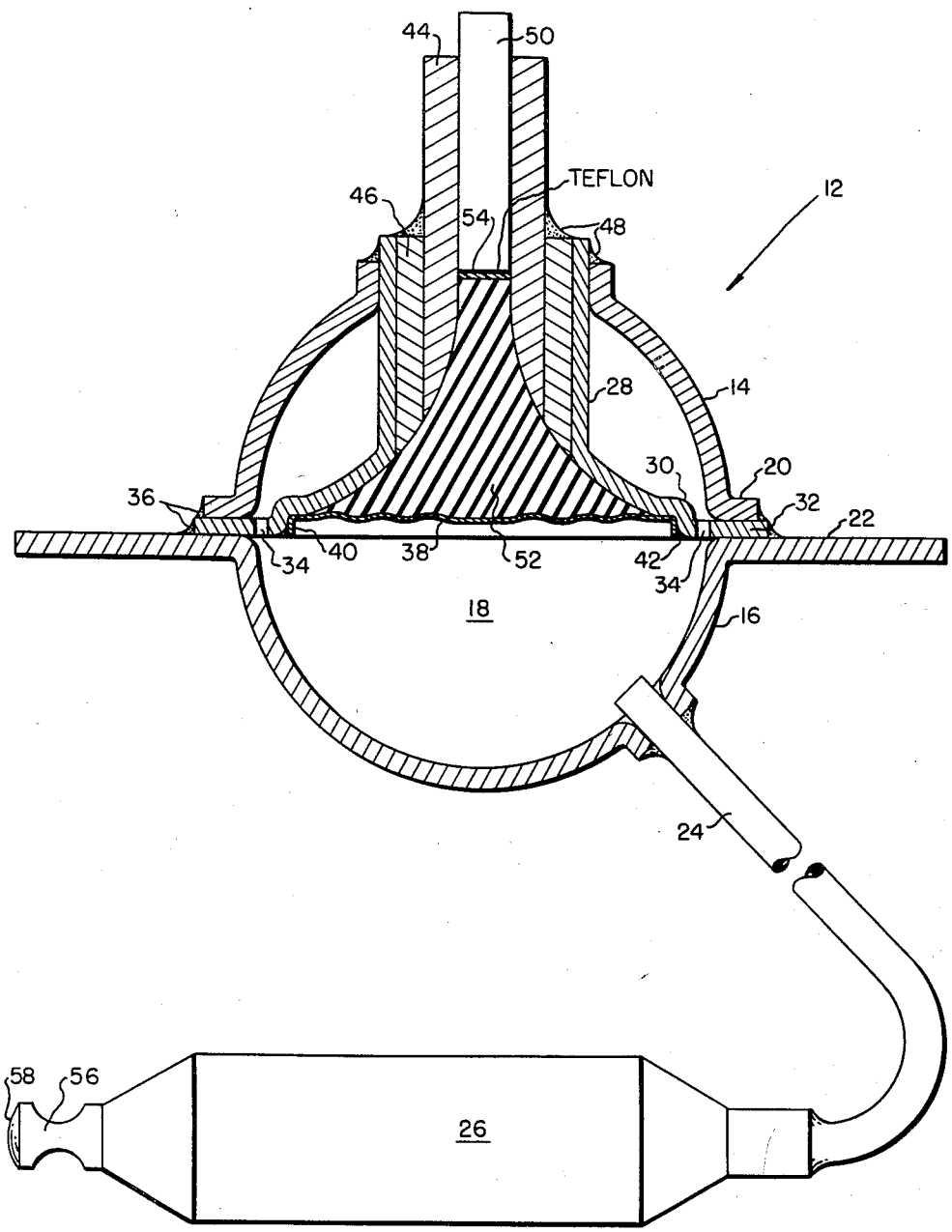

2,931,228

HIGH PRESSURE TRANSDUCER

John E. Woods, Cohasset, Mass., assignor to Standard-Thomson Corporation, Waltham, Mass., a corporation of Delaware Application August 24, 1956, Serial No. 606,093

5 Claims. (Cl. 73—368.4)

The present invention relates generally to mechanical transducers for converting applied pressure to lineal displacement of an actuator element. The invention in more particularly concerned with actuators of the general type including a body of deformable material of limited compressibility which deforms to impel the actuator element under pressure applied through a diaphragm.

This invention comprises an improvement upon the actuator disclosed in my copending application Serial No. 420,120, filed March 31, 1954. It is an important object of this invention to provide an assembly adapted to withstand the large internal pressures to which actuators of this general class are subjected in certain applications.

Essentially, actuators of this type are so constructed that the applied pressure displaces a given volume of the deformable body through the diaphragm, and the output element, which may be a sliding pin for example, moves through a sufficient distance to compensate for this displaced volume. This permits the use of an actuator element or pin of relatively small diameter, for example one-eighth of an inch or less, since a given volume displacement produces greater lineal movement for a pin of small cross-section than for one of larger cross-section.

It is obvious, of course, that some external means must be provided to oppose outward motion of the pin. In practice, it is found that the production of pin motion against this opposing force necessitates the generation of large pressures within the body of the actuator, these pressures ranging from several hundred pounds per square inch up to thousands of pounds per square inch depending upon the particular application. These pressures in turn necessitate the use of heavy construction for the body of the actuator, which may lead to increased cost and undesirable bulk. The bulk of the housing is undesirable, not only because of the space and material utilized, but also because it reduces the responsiveness of the device in those applications where it is intended to operate as a function of ambient temperature conditions. This point will be more fully discussed below.

For the foregoing reasons, it is a further object of the invention to provide an assembly that can be easily and cheaply fabricated, while yet withstanding the high pressures indicated above.

Another object is to provide an assembly having small bulk and relatively thin walls to increase the responsiveness of the actuator to ambient temperature conditions where this is desired.

With the above and other objects in view, the principal feature of this invention comprises an assembly including a housing defining a chamber having a pair of substantially hemispherical walls, and a support secured in an opening in the chamber, the support having a sleeve bearing and an outwardly-flared portion within the chamber which is closed by a metal diaphragm, and within which the deformable impeller body is assembled. By this arrangement, there is provided an extremely rigid assembly wherein the pressure forces are so distributed that a housing of minimum wall thickness may be provided, and wherein a large part of the assembly is situated within the chamber in a position of respose under the applied pressures.

Another feature of the invention resides in the ability of the device to respond rapidly to changes in the ambient temperature, while yet having sufficient strength to withstand the large applied pressures.

Another feature resides in the adaptability of the assembly to connection with a capillary for remote control.

Other features of the invention reside in certain features of construction, assembly and modes of operation that will become evident from a consideration of the following description of a prefered embodiment thereof, having reference to the appended drawing.

Referring to the drawing, there is provided a housing 12 which includes a pair of substantially hemispherical portions 14 and 16, the portions 14 and 16 being mutually disposed to define a substantially spherical chamber 18. The portions 14 and 16 are provided with outwardly extending flanges 20 and 22, respectively, the flange 22 being preferably wider than the flange 20 and being provided with mounting holes or other suitable means, not shown, for mounting the actuator housing in relation to the device to be controlled.

The portion 16 of the housing has an opening to which is soldered an end of a capillary 24 extending to a thermal bulb 26 remote from the housing 12. The bulb 26 is filled with a thermal liquid that communicates via the capillary within the chamber 18. The chamber 18, the capillary 24 and the bulb 26 are entirely filled with a thermal liquid.

The portion 14 of the housing is provided with an opening into which is received a support member 28, the member 28 having a cylindrical portion and a generally conical flared portion terminated by a shoulder 30 and a flange 32. The support 28 is perforated within the chamber 18 by one or more holes 34 intermediate the shoulder 30 and the flange 32. The housing portions 14 and 16 and the support 28 are securely joined by any suitable means that will form an hermetic seal, for example, resistance welding, or brazing as indicated at 36.

A thin-walled flexible imperforate metal diaphragm 38, having an annular rim portion 40 adapted to fit within the shoulder 30 in the support 28, is soldered, welded, or brazed to the support 28 as indicated at 42.

It will thus be observed that the chamber 18 is hermetically sealed and entirely filled with thermal liquid except within the space defined by the support 28 and the diaphragm 38.

A pair of concentric sleeves 44 and 46, having inner end surface curvatures identical with the curvature of the flared portion of the support 28, are received in the latter and welded or brazed to the housing 12 as indicated at 48. A rigid, cylindrical metal pin 50 is slidably received within the sleeve 44.

Between the diaphragm 38 and the pin 50 there is inserted a body 52 of deformable material having limited compressibility, for example rubber or a rubber substitute as described in said copending application. Between the body 52 and the pin 50 is inserted a wafer 54 adapted to prevent the body 52 from extruding out of the housing around the sides of the actuator pin 50. A suitable material for the wafer 54 is "Teflon," which is a trademark designating a polymer or co-polymer of tetrafluoroethylene.

The device is preferably assembled as follows. First, the diaphragm 38 is assembled within the shoulder 30 of the support 28 and sealed thereto as indicated at 42. Next, the support 28 is received within the hole in the hemispherical portion 14 of the housing with the flange 32 resting upon the flange 20. Next, the hemispherical portion 16 of the housing is assembled with its flange 22 in contact with the flange 32. The three flanges are then secured together as indicated at 36.

Next, the body 52 is received within the support, an operation which is facilitated by the fact that the throat or cylindrical portion of the support is of relatively large diameter. After the body 52 is in place, the sleeves 46 and 44 are assembled as shown in the drawing and secured to the housing as indicated at 48. The Teflon insert 54 and the pin 50 are then received within the sleeve 44. Finally, the capillary 24 is secured to the opening in the hemispherical portion 16 of the housing.

The assembly is filled with thermal liquid in a conventional manner by means of a filling tube 56 at one end of the bulb 26 or in any other suitable location. The method of filling is fully described in said copending application. After filling, the tube 56 is crimped and sealed by soldering or brazing as indicated at 58.

In operation, the changes of temperature experienced by the thermal liquid in the bulb 26 cause changes of pressure within the chamber 18. Increasing pressure causes upward deflection of the diaphragm 38, and since the body 52 is closely confined its upper portion urges the pin outwardly. The volume displaced by the pin in this motion is equal to the volume displaced by the diaphragm 38, less a small amount resulting from slight compression of the body 52. It will be understood that the body 52 has limited compressibility and most of the volume displacement goes toward producing pin motion.

The holes 34 in the support 28 allow the liquid fill to surround the portion of the support within the chamber. Also, by reason of the flexibility of the diaphragm 38, the pressure within the body 52 substantially equals the pressure of the liquid fill surrounding the support. Hence, the pressures against the inner and outer walls of the diaphragm and the flared portion of the support 28 are equal. These parts, therefore, are in repose at all pressures.

Also, the walls of the chamber 18, being of spherical shape, provide the optimum resistance to internal pressure for a given volume of fill and wall thickness. This same advantage may be achieved, but to a somewhat lesser degree, with a housing having a cylindrical wall with hemispherical ends, if desired.

The spherical shape of the housing, which reduces the minimum wall thickness necessary to resist a certain maximum applied pressure, not only permits a reduction in weight and bulk of the device but also provides the optimum rate of transfer of heat through the wall from the surroundings to the liquid fill within the chamber 18. For this reason, the device as illustrated can be made ambient temperature-sensitive. Such a device is useful either with or without remote control, according to the application. As illustrated in the drawing, the device is sensitive both to ambient temperature and to the remote temperature at the bulb 26. (Insulation around the housing may be used to reduce or substantially eliminate the sensitivity to ambient conditions at the actuator, if desired.) According to a modification of the device, the opening in the lower portion 16 of the housing is used for filling purposes only, and is not connected with a remote bulb. In this case, the device responds solely to ambient temperature conditions and may be used as a thermostat.

It will be understood that in any case the pin 50 is used to move an external device, not shown. This may be, for example, a switch lever, toggle or the like, that is adapted to provide resilient resistance to outward motion of the pin.

It will be further understood that while the invention has been described with reference to a preferred embodiment thereof for purposes of illustration, variations from the form illustrated and described may be accomplished for purposes of adapting the device to particular applications, in accordance with techniques familiar to those skilled in this art, without departing from the spirit or scope of the invention.

Having thus described the invention, I claim:

1. An actuator having, in combination, a housing including a pair of substantially hemispherical portions mutually disposed to define a substantially spherical chamber, the housing having an opening communicating with the chamber, a hollow support having a sleeve bearing secured in said opening, the support having an outwardly flared portion within the chamber of greater inner diameter than said bearing, said flared portion terminating in a flange secured at its periphery between the adjacent edges of said hemispherical portions of the housing, the flange having a perforation within the chamber, a flexible metal diaphragm enclosing said flared portion with said perforation external thereto, a thermal liquid filling the entire space in said chamber external to said diaphragm and support, an actuator element slidably received in said bearing, and a deformable body of limited compressibility contained within said flared portion of the support and bearing upon said element.

2. An actuator having, in combination, a housing including a pair of substantially hemispherical portions mutually disposed to define a substantially spherical chamber, each of said portions having an opening communicating with the chamber, a hollow support having a sleeve bearing secured in one of said openings, the support having an outwardly flared portion within the chamber of greater inner diameter than said bearing, said flared portion terminating in a flange secured at its periphery between the adjacent edges of said hemispherical portions of the housing, the flange having a perforation within the chamber, a flexible metal diaphragm enclosing said flared portion with said perforation external thereto, a capillary communicating with the other of said openings and extending to a point remote from said housing, a thermal liquid filling said capillary and the entire space in the chamber external to said diaphragm and support, an actuator element slidably received in said bearing, and a deformable body of limited compressibility contained within said flared portion of the support and bearing upon said element.

3. An actuator having, in combination, a housing consisting of a plurality of members assembled to define a substantially spherical chamber, the housing having an opening communicating with the chamber, a hollow support having a sleeve bearing secured in said opening, the support having an outwardly flared portion within the chamber of greater inner diameter than said bearing, said flared portion terminating in a flange secured at its periphery to the wall of the housing, the flange having perforation within the chamber, a flexible metal diaphragm enclosing said flared portion with said perforation external thereto, a thermal liquid filling the entire space in said chamber external to said diaphragm and support, an actuator element slidably received in said bearing, and a deformable body of limited compressibility contained within said flared portion of the support and bearing upon said element.

4. An actuator having, in combination, a housing defining a substantially spherical chamber and having an opening communicating with the chamber, a hollow support sealed in said opening and having a sleeve bearing and a portion extending into the chamber, said portion terminating in a flange secured at its periphery to the wall of the chamber, the flange having a perforation, a flexible member closing said portion with the perforation external thereto, a thermal material filling the entire space in said chamber external to said flexible member and support, an actuator element slidably received in said bearing, and a deformable body of limited compressibility contained within said portion of the support and bearing upon said element.

5. An actuator having, in combination, a housing defining a substantially spherical chamber and having an opening communicating with the chamber, a hollow support hermetically sealed by metallic fusion in said opening and having a sleeve bearing and a portion extending into the chamber, a flexible metallic diaphragm member hermetically closing said portion by metallic fusion, a pressure-transmitting material completely filling the space in said chamber external to said diaphragm member and support, said space being hermetically sealed throughout by metallic fusion, an actuator element slidably received in said bearing and a deformable body of limited compressibility contained within said portion of the support and bearing upon said element.

References Cited in the file of this patent

UNITED STATES PATENTS

| | | |
|---|---|---|
| 373,324 | Wheeler | Nov. 15, 1887 |
| 515,591 | Lawler | Feb. 27, 1894 |
| 1,356,175 | Swift | Oct. 19, 1920 |
| 2,115,502 | Vernet | Apr. 26, 1938 |

FOREIGN PATENTS

| | | |
|---|---|---|
| 531,280 | Great Britain | Jan. 1, 1941 |